Apr. 24, 1923. 1,453,255
H. A. POPPERT
STEAM PRESSURE COOKER
Filed Aug. 8, 1922
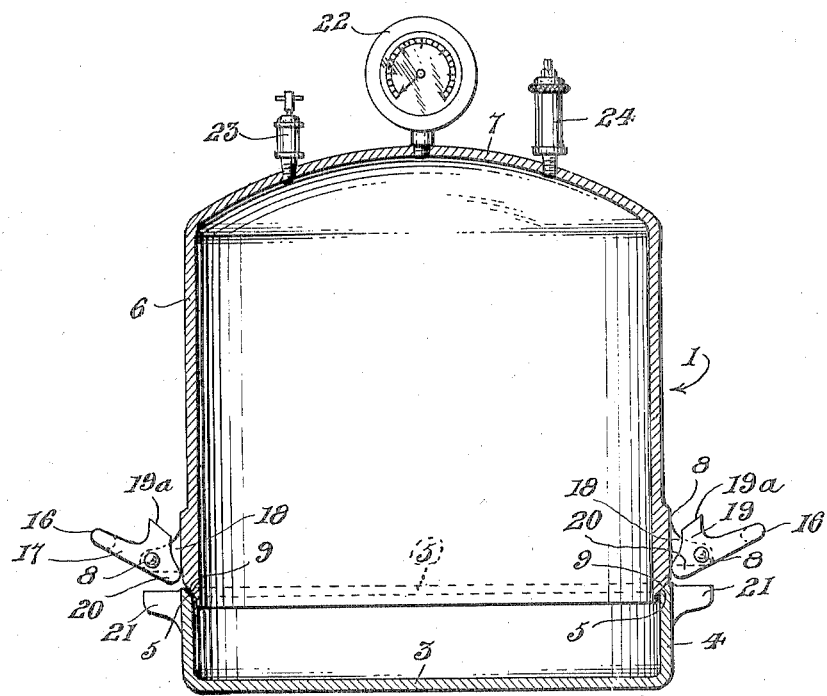
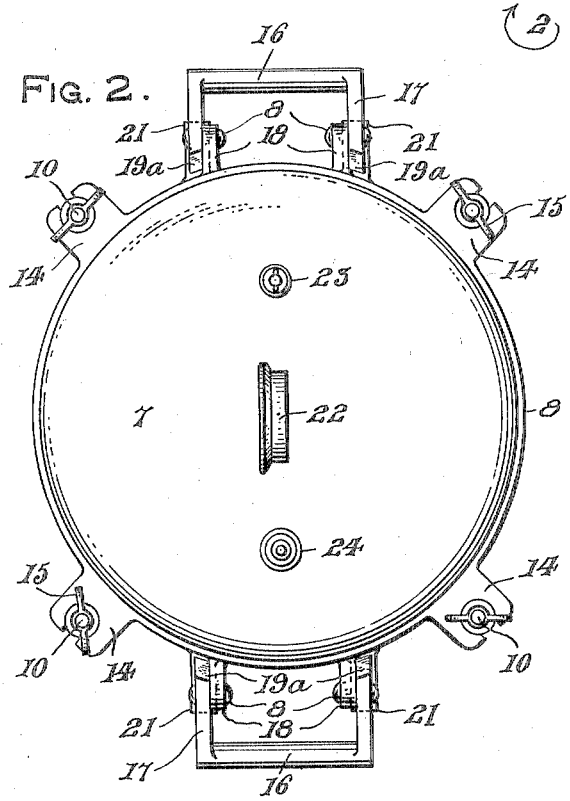
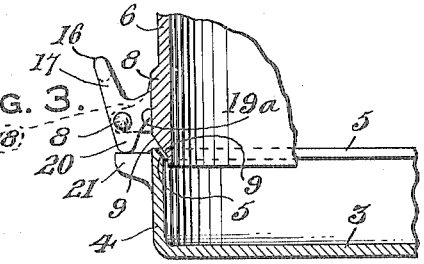
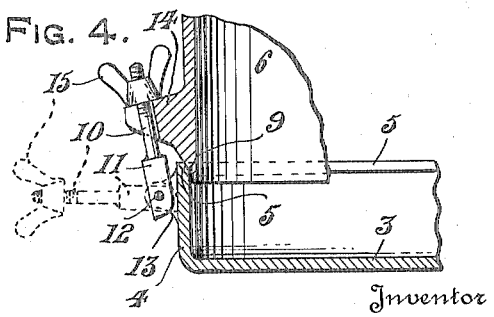
Inventor
Henry A. Poppert
By F. K. Bryant
Attorney.

Patented Apr. 24, 1923.

1,453,255

UNITED STATES PATENT OFFICE.

HENRY A. POPPERT, OF MILWAUKEE, WISCONSIN, ASSIGNOR TO HENRY A. POPPERT & SON COMPANY, OF MILWAUKEE, WISCONSIN, A CORPORATION OF WISCONSIN.

STEAM-PRESSURE COOKER.

Application filed August 8, 1922. Serial No. 580,424.

*To all whom it may concern:*

Be it known that I, HENRY A. POPPERT, a citizen of the United States of America, residing at Milwaukee, in the county of Milwaukee and State of Wisconsin, have invented certain new and useful Improvements in Steam-Pressure Cookers, of which the following is a specification.

This invention relates to certain new and useful improvements in steam pressure cookers and has particular reference to a cooking utensil especially designed for household use wherein different fruits or vegetables may be simultaneously cooked within a receptacle by steam pressure confined therein.

The primary object of the invention resides in the provision of a steam pressure cooker formed of upper and lower separable sections having connecting means therebetween to render the cooker air and steam tight, a steam pressure gage being associated with the upper section while a pet cock and safety valve carried by said upper section are provided for controlling the pressure of steam within the cooker.

The invention further provides in a steam cooker of the type above set forth, the provision of connecting means between the upper and lower sections of the cooker in the form of handles carried by one of the sections having shoulders adapted to engage lugs carried by the other section to effect a separating movement of the two sections when desired and also constituting lifting handles for the section carrying the same. The handles are so constructed as to cooperate with the sections carrying the same to limit the movement of said handles toward said cooker section to maintain the gripping portions of said handles at all times spaced from the cooker section.

A still further object of the invention is to provide a steam pressure cooker formed of two separable sections with the main body portion of the cooker embodied in the upper section in the form of a dome-shaped cover, a ground joint being provided between the two sections while cooperating lugs and fastening screws retain the sections in air and steam tight relation.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a vertical central sectional view of a steam pressure cooker constructed in accordance with the present invention showing the position assumed by the handles when the two sections of the cooker are assembled, and further showing the major portion of the cooker embodied in one of the sections carrying a steam pressure gage, pet cock and safety valve, Figure 2 is a top plan view of the device showing the side handles carried by the upper sections and the clamping lugs and adjusting screws for retaining the sections assembled, Figure 3 is a detail sectional view showing the position assumed by the handles when the sections are to be separated, and Figure 4 is a detail sectional view showing the tightening or clamping screw for retaining the sections together.

Referring more in detail to the accompanying drawing, there is illustrated a steam pressure cooker formed of upper and lower sections 1 and 2 detachably connected together by an air and steam tight joint, the cooker being preferably constructed of heavy plate aluminum or similar material. The lower section 2 is of substantial pan-shape embodying a flat bottom wall 3 and a relatively short perpendicular side wall 4 having an inner bevelled ground edge 5 shown more clearly in Figs. 3 and 4. The upper section 1 of the cooker embodies the major portion of the body and includes a side wall 6 having a dome-shaped cover 7, the lower edge of the side wall 6 being of increased cross sectional area as shown in Figs. 1 and 3 to provide an annular shoulder 8 having the lower and outer edge thereof beveled and ground as at 9 for engagement with the beveled edge 5 of the lower section.

The connecting and locking means for the two sections 1 and 2 includes screw bolts 10 having heads 11 carried by one end thereof pivotally mounted as at 12 upon lugs 13 carried by the lower sections 2, the upper threaded ends of the bolts 10 passing between bifurcated lugs 14 for the reception of thumb nuts 15 threaded thereon and engaging the bifurcated lugs 14 to hold the ground faces 5 and 9 in steam tight relation.

Combined lifting handles and separating levers for the upper section 1 are pivotally carried by said section, the same being oppositely disposed and each comprising a U-shaped handle frame embodying a gripping portion 16 carrying side arms 17 are pivotally mounted as at 18 upon outwardly directed lugs 18ª carried by the shoulder 8 of the upper section. The side legs 17 of the handles carry lateral projections 19 having inclined terminal faces 19ª adapted for engagement with the shoulder 8 of the upper section as shown in Fig. 3 for limiting the movement of the gripping portion 16 of the handles toward the side walls 6 of the upper section to eliminate the hands of the operator coming into contact with the heated upper section. Each side leg 17 carries a terminal cam extension 20 which is adapted to engage a lug 21 carried by the lower sections 2 for purposes of elevating or separating the two sections to the position shown in Fig. 3 upon inward swinging movement of said handles.

Food placed within the device being cooked by steam pressure, a steam pressure gage 22 is carried by the upper wall 7 of the upper section 1, said wall also carrying a pet cock 23 and a safety valve 24.

From the above detail description of the device, it is believed that the construction and operation thereof will at once be apparent, it being understood that a rack frame may be positioned within the cooker for the purpose of supporting separate pans or trays containing different foods, such as vegetables, meats and fruits, water being placed in the lower section 2 at a level below the upper edge of the side wall 4 with the cover section 1 placed thereon. When the cover section 1 is placed upon the lower section 2, the handles 16 normally occupy the position shown in Fig. 3, and upon swinging said handles outwardly, the cam surfaces or lugs 20 carried by the side legs 16 of the handles are disengaged from the lugs 21 carried by the lower section to permit intimate engagement between the ground beveled surfaces or edges 5 and 9 formed on the two cooker sections, the clamping and tightening screw bolts 10 then moved into engagement with the bifurcated lugs 14 and so retained by the thumb nuts 15 rendering the cooker air and steam tight. The safety valve 24 associated with the cover of the upper section may be initially set to open upon reaching a predetermined steam pressure within the cooker, said pressure being registered upon the gage 22 while the pet cock 23 is opened when a cooking operation has been completed to permit the immediate escape of steam from the cooker and also the instant removal of the cover or upper section 1. Should the steam pressure within the cooker cause a binding engagement between the two sections 1 and 2, inward swinging movement of the handles 16 during the lifting operation of the upper section 1, will cause the cam lugs 20 carried by said handle to ride upon the lugs 21 carried by the lower section and release or separate the two sections by a lever action, it being understood, of course, that the screw bolts 10 were released prior to the lifting operation. By the provision of a cooker of the type disclosed in this application, there is noted a considerable saving in time, labor and fuel used in cooking articles of food and liability of burning or scorching the same during the cooking operation is entirely eliminated. It is possible to cook three or more entirely different kinds of food at the same time without the flavors thereof mingling or blending. The device may also be employed in different forms of cooking, such as canning fruit and vegetables as well as preparing the usual daily meals. By providing the major body portion of the device in the upper section or cover thereof, the user thereof is assured that too much water will not initially be placed in the lower section for overflowing into the lower pan placed therein.

While there is herein shown and described the preferred embodiment of the present invention it is nevertheless to be understood that minor changes may be made therein without departing from the spirit and scope of the invention as claimed.

What I claim is:—

1. In a steam pressure cooker embodying a receptacle formed of two separable sections adapted to be held together, combined lifting handles and separating means carried by the upper section and cooperating with the lower section, said lifting handles comprising U-shaped handle frames having the free ends of the side legs pivoted to the upper section, cam-lug extensions carried by the side legs, and lugs carried by the lower section adapted to be engaged by said cam-lugs for separating the cooker sections.

2. In a steam pressure cooker embodying a receptacle formed of two separable sections adapted to be held together, combined lifting handles and separating means carried by the upper section and cooperating with the lower section, said lifting handles comprising U-shaped handle frames having the free ends of the side legs pivoted to the upper section, cam-lug extensions carried by the side legs, lugs carried by the lower section adapted to be engaged by said cam-lugs for separating the cooker sections, and lateral extensions carried by said handle legs adapted to contact the outer side wall of the upper section to limit movement of the handle frames toward the upper section.

3. In a steam pressure cooker embodying a receptacle formed of two separable sections adapted to be held together, combined lifting handles and separating means carried by the upper section and cooperating with the lower section, each of said lifting handles embodying a leg pivoted to the upper section, a cam-lug extension carried by said leg and a lug carried by the lower section adapted to be engaged by the cam-lug for separating the cooker sections when the handle is operated to raise the upper section.

In testimony whereof I affix my signature.

HENRY A. POPPERT.